US012643473B2

(12) United States Patent
Miu et al.

(10) Patent No.: US 12,643,473 B2
(45) Date of Patent: Jun. 2, 2026

(54) CAMERA PASSIVE GLARE AND NATURAL LIGHT BACKSCATTER REDUCTION

(71) Applicant: Magna Electronics Inc., Auburn Hills, MI (US)

(72) Inventors: Traian Miu, Oakville (CA); Gabriele W. Sabatini, Keswick (CA)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 19/050,172

(22) Filed: Feb. 11, 2025

(65) Prior Publication Data

US 2025/0256650 A1      Aug. 14, 2025

Related U.S. Application Data

(60) Provisional application No. 63/552,426, filed on Feb. 12, 2024.

(51) Int. Cl.
B60R 1/22 (2022.01)
H04N 23/55 (2023.01)

(52) U.S. Cl.
CPC .............. B60R 1/22 (2022.01); H04N 23/55 (2023.01); B60R 2300/307 (2013.01)

(58) Field of Classification Search
CPC .... B60R 1/22; B60R 2300/307; H04N 23/55; H04N 23/56; G02B 2027/0138; G02B 21/0032; G02B 27/28
USPC ................................................ 348/148, 143
See application file for complete search history.

(56) References Cited

U.S. PATENT DOCUMENTS

| | | |
|---|---|---|
| 3,854,140 A | 12/1974 | Ranghelli et al. |
| 5,216,430 A | 6/1993 | Rahm et al. |
| 5,550,677 A | 8/1996 | Schofield et al. |
| 5,670,935 A | 9/1997 | Schofield et al. |
| 5,949,331 A | 9/1999 | Schofield et al. |
| 6,067,041 A | 5/2000 | Kaiser et al. |
| 6,624,780 B1 | 9/2003 | Fouts et al. |
| 7,009,551 B1 | 3/2006 | Sapletal et al. |
| 7,038,577 B2 | 5/2006 | Pawlicki et al. |
| 7,147,246 B2 | 12/2006 | Breed et al. |
| 7,164,117 B2 | 1/2007 | Breed et al. |
| 7,243,945 B2 | 7/2007 | Breed et al. |
| 7,333,455 B1 | 2/2008 | Bolt et al. |
| 7,407,029 B2 | 8/2008 | Breed et al. |
| 7,415,126 B2 | 8/2008 | Breed et al. |

(Continued)

*Primary Examiner* — Sherrie Hsia
(74) *Attorney, Agent, or Firm* — HONIGMAN LLP

(57) ABSTRACT

A vehicular camera includes first and second imaging sensors respectively capturing first and second image data. Light incident at the camera passes through an optical element to be incident at a polarizing beam splitter (PBS). With the camera disposed at a vehicle, circularly polarized light reflected from an object and backscattered natural light are incident at the camera. First and second portions of the backscattered light respectively have first and second orthogonal polarization states. The circularly polarized light passes through the optical element and is incident at the PBS as linearly polarized light having the first orthogonal polarization state. The PBS directs the linearly polarized light and the first portion of the backscattered light to the first imaging sensor and directs the second portion of the backscattered light to the second imaging sensor. A vehicular vision system detects an object based on processing of the first and second image data.

23 Claims, 2 Drawing Sheets

(56) References Cited

U.S. PATENT DOCUMENTS

| | | | |
|---|---|---|---|
| 7,570,785 | B2 | 8/2009 | Breed |
| 7,596,242 | B2 | 9/2009 | Breed et al. |
| 7,655,895 | B2 | 2/2010 | Breed |
| 7,660,437 | B2 | 2/2010 | Breed |
| 7,663,502 | B2 | 2/2010 | Breed |
| 7,676,062 | B2 | 3/2010 | Breed et al. |
| 7,720,580 | B2 | 5/2010 | Higgins-Luthman |
| 7,734,061 | B2 | 6/2010 | Breed et al. |
| 7,738,678 | B2 | 6/2010 | Breed et al. |
| 7,769,513 | B2 | 8/2010 | Breed et al. |
| 7,788,008 | B2 | 8/2010 | Breed |
| 7,831,358 | B2 | 11/2010 | Breed et al. |
| 7,855,755 | B2 | 12/2010 | Weller et al. |
| 7,887,089 | B2 | 2/2011 | Breed et al. |
| 7,983,817 | B2 | 7/2011 | Breed |
| 8,152,198 | B2 | 4/2012 | Breed et al. |
| 8,189,825 | B2 | 5/2012 | Breed |
| 8,538,636 | B2 | 9/2013 | Breed |
| 8,604,932 | B2 | 12/2013 | Breed et al. |
| 8,948,442 | B2 | 2/2015 | Breed et al. |
| 9,102,220 | B2 | 8/2015 | Breed |
| 9,129,505 | B2 | 9/2015 | Breed et al. |
| 9,290,146 | B2 | 3/2016 | Breed |
| 10,071,687 | B2 | 9/2018 | Ihlenburg et al. |
| 10,099,614 | B2 | 10/2018 | Diessner |
| 11,460,536 | B2 | 10/2022 | Miu et al. |
| 2003/0209893 | A1 | 11/2003 | Breed et al. |
| 2004/0129478 | A1 | 7/2004 | Breed et al. |
| 2005/0017488 | A1 | 1/2005 | Breed et al. |
| 2005/0046584 | A1 | 3/2005 | Breed |
| 2005/0131607 | A1 | 6/2005 | Breed |
| 2005/0248136 | A1 | 11/2005 | Breed et al. |
| 2006/0208169 | A1 | 9/2006 | Breed et al. |
| 2007/0086624 | A1 | 4/2007 | Breed et al. |
| 2007/0135984 | A1 | 6/2007 | Breed et al. |
| 2007/0154063 | A1 | 7/2007 | Breed |
| 2007/0193811 | A1 | 8/2007 | Breed et al. |
| 2007/0262574 | A1 | 11/2007 | Breed et al. |
| 2007/0280505 | A1 | 12/2007 | Breed |
| 2007/0282506 | A1 | 12/2007 | Breed et al. |
| 2008/0018523 | A1 | 1/2008 | Kelly, Jr. et al. |
| 2008/0036187 | A1 | 2/2008 | Breed |
| 2008/0036580 | A1 | 2/2008 | Breed |
| 2008/0037803 | A1 | 2/2008 | Breed |
| 2008/0051957 | A1 | 2/2008 | Breed et al. |
| 2008/0069403 | A1 | 3/2008 | Breed |
| 2008/0129541 | A1 | 6/2008 | Lu et al. |
| 2008/0142713 | A1 | 6/2008 | Breed et al. |
| 2008/0143085 | A1 | 6/2008 | Breed et al. |
| 2008/0144944 | A1 | 6/2008 | Breed |
| 2008/0195261 | A1 | 8/2008 | Breed |
| 2008/0234899 | A1 | 9/2008 | Breed et al. |
| 2008/0294315 | A1 | 11/2008 | Breed |
| 2009/0066065 | A1 | 3/2009 | Breed et al. |
| 2009/0092284 | A1 | 4/2009 | Breed et al. |
| 2009/0251362 | A1 | 10/2009 | Margomenos et al. |
| 2009/0261979 | A1 | 10/2009 | Breed et al. |
| 2011/0285982 | A1 | 11/2011 | Breed |
| 2014/0097957 | A1 | 4/2014 | Breed et al. |
| 2017/0010347 | A1 | 1/2017 | Schütte et al. |
| 2018/0120413 | A1 | 5/2018 | Stoeckle et al. |
| 2019/0165488 | A1 | 5/2019 | Au |
| 2019/0187247 | A1 | 6/2019 | Izadian et al. |
| 2020/0011989 | A1 | 1/2020 | Takahashi et al. |
| 2020/0072947 | A1 | 3/2020 | Miu et al. |
| 2020/0166637 | A1 | 5/2020 | Hess et al. |
| 2022/0128352 | A1 | 4/2022 | Binder |

CAMERA PASSIVE GLARE AND NATURAL LIGHT BACKSCATTER REDUCTION

CROSS REFERENCE TO RELATED APPLICATION

The present application claims the filing benefits of U.S. provisional application Ser. No. 63/552,426, filed Feb. 12, 2024, which is hereby incorporated herein by reference in its entirety.

FIELD OF THE INVENTION

The present disclosure relates generally to an imaging assembly and more specifically to an imaging assembly utilizing polarized light in a vehicle and a method of operating the imaging assembly.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

It is an aspect of the present disclosure to provide an imaging assembly. The imaging assembly includes an optical device configured to receive transmitted light from at least one light source having a first polarization after reflecting from a scene as reflected light having a second polarization different than the first polarization along with backscattered natural light and output an altered light. The imaging assembly also includes a camera assembly configured to receive the altered light and capture imaging of the scene using the altered light. The imaging of the scene captured has a reduction in glare and the backscattered natural light.

For example, a vehicular camera assembly includes a first imaging sensor that is operable to capture first image data, a second imaging sensor that is operable to capture second image data, a polarizing beam splitter (PBS), and an optical element. Light incident at the vehicular camera assembly passes through the optical element to be incident at the PBS. The vehicular camera assembly is configured to be disposed at a vehicle equipped with a vehicular vision system. With the vehicular camera assembly disposed at the vehicle, and with a light source at the vehicle emitting circularly polarized light, (i) reflected circularly polarized light reflected from an object is incident at the vehicular camera assembly and (ii) backscattered natural light is incident at the vehicular camera assembly. A first portion of the backscattered natural light has a first orthogonal polarization state and a second portion of the backscattered natural light has a second orthogonal polarization state. The reflected circularly polarized light incident at the vehicular camera assembly passes through the optical element and is incident at the PBS as reflected linearly polarized light comprising the first orthogonal polarization state. The first portion and the second portion of the backscattered natural light pass through the optical element. The PBS (i) directs the reflected linearly polarized light and the first portion of the backscattered natural light to the first imaging sensor capturing the first image data and (ii) directs the second portion of the backscattered natural light to the second imaging sensor capturing the second image data. The vehicular vision system detects an object based on processing of the first image data and the second image data.

These and other objects, advantages, purposes and features of the present invention will become apparent upon review of the following specification in conjunction with the drawings. The description and specific examples in this summary are intended for purpose of illustration only and are not intended to limit the scope of the present disclosure.

DESCRIPTION OF THE PREFERRED EMBODIMENTS

Motor vehicles are increasingly being equipped with sensors and cameras that detect the environment and terrain surrounding the motor vehicle. For example, some vehicles include sensor assemblies that provide real-time data regarding the terrain and/or other objects in the vicinity of the vehicle. More specifically, camera or imaging assemblies have been used to detect the presence and position of objects near the motor vehicle while the vehicle is stationary or while the vehicle is moving. The imaging captured by these imaging assemblies can be used by various systems of the motor vehicle to provide safety features such as vehicle control, collision avoidance, and parking assistance and can, for example, assist the driver while driving the vehicle and/or to intervene in controlling the vehicle.

Such imaging can work well in many environmental conditions; however, perception issues can occur when the vehicle travels in inclement environments. For example, glare and natural light backscatter can adversely affect the imaging. Thus, the recognition and/or differentiation of objects in the imaging may be more challenging.

Thus, there is an increasing need for improved imaging assemblies capable of operating in adverse weather, for example.

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
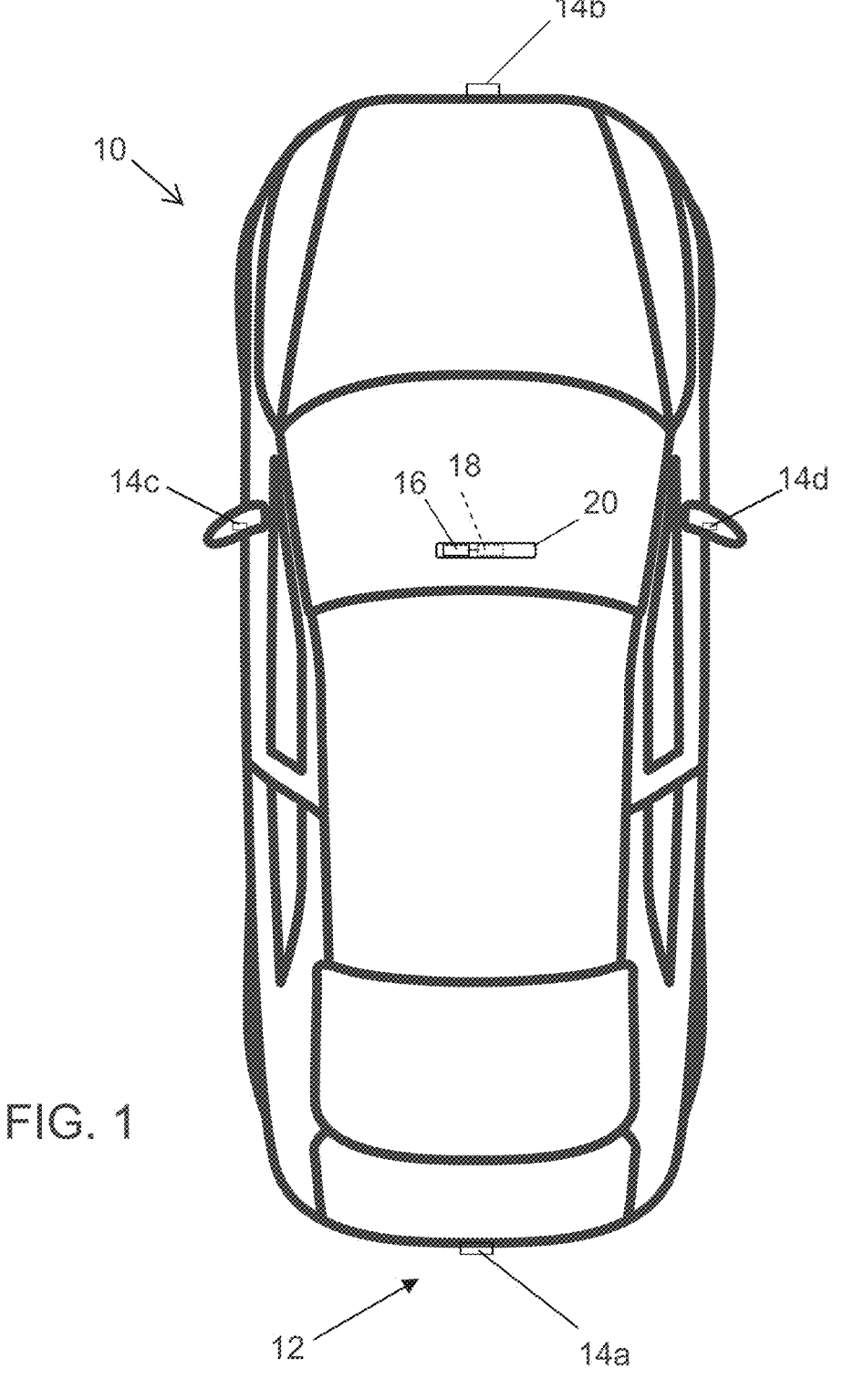
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rear backup camera or rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
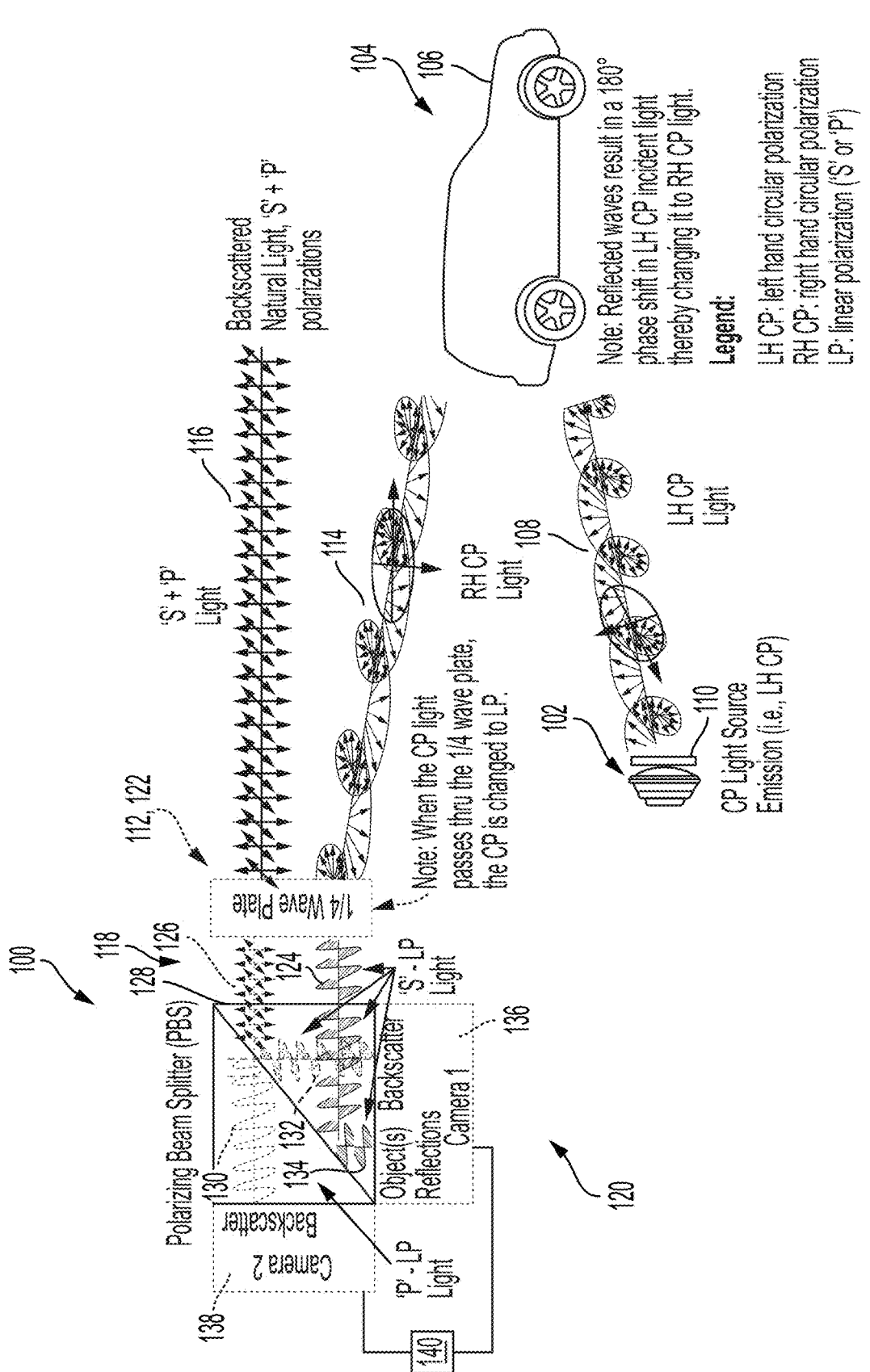
FIG. 2 is a diagram showing an imaging assembly and illustrating light transmitted by a light source and reflected from an object in a scene and received by the imaging assembly along with backscattered natural light according to aspects of the disclosure.

FIG. 2 is a diagram showing an imaging assembly 100. For example, one or more of the cameras at the vehicle 10 may include the imaging assembly 100, or the imaging assembly 100 may be remote from the vehicular cameras. The imaging assembly 100 captures image data that is processed at the ECU 18 by the vehicular vision system 12. As shown, at least one light source 102 or circularly polarized light source illuminates a scene 104 with an object 106 (e.g., a vehicle) present therein with transmitted light 108 having a first polarization (e.g., left hand circularly polarized). For example, the at least one light source 102 may include a polarizer 110. The imaging assembly 100 includes an optical device 112 configured to receive transmitted light 108 from the at least one light source 102 after reflecting from the scene 104 as reflected light 114 having a second polarization (e.g., right hand circularly polarized) different than the first polarization. The reflection of the transmitted light 108 of the at least one light source 102 having the first polarization from the scene 104 results in a 180-degree phase shift to change its polarization (e.g., from left hand circularly polarized to right hand circularly polarized). The optical device 112 is also configured to receive backscattered natural light 116 (e.g., with a first orthogonal polarization state S and a second orthogonal polarization state P, i.e., having a random polarization). The optical device 112 outputs an altered light 118 based on the received light 114, 116. The imaging assembly 100 also includes a camera assembly 120 configured to receive the altered light 118 and capture image data representative of the scene 104 using the altered light 118. The altered light used in imaging the scene 104 has a reduction in glare and reduced backscattered natural light 116.

According to aspects of the disclosure, the optical device 112 includes a quarter-wave plate 122 configured to change the reflected light 114 from the second polarization to a scene reflection light 124 being linearly polarized with a first orthogonal linear polarization state (i.e., S linearly polarized light) and to output or emit or transmit the backscattered natural light 116 as transmitted natural light 126. Thus, when the circularly polarized light (i.e., reflected light 114) passes through the quarter-wave plate 122, it becomes linearly polarized. In addition, the camera assembly 120 may include a polarizing beam splitter 128 configured to receive the transmitted natural light 126 and to pass through or transmit a transmitted backscatter light 130 being linearly polarized with a second orthogonal linear polarization state (i.e., P linearly polarized light) different than the first orthogonal linear polarization state and to reflect a reflected backscatter light 132 being linearly polarized with the first orthogonal linear polarization state. The polarizing beam splitter 128 may be configured to receive the scene reflection light 124 and to reflect a reflected scene light 134 being linearly polarized with the first orthogonal linear polarization state while preventing transmission of the scene reflection light 124 therethrough. Specifically, the reflected backscatter light 132 and the transmitted backscatter light 130 may each comprise approximately fifty percent of the transmitted natural light 126 transmitted through the quarter-wave plate 122.

The camera assembly 120 may additionally include a first camera 136 configured to receive the reflected scene light 134 and the reflected backscatter light 132 and to capture a first imaging of the scene 104 including the reflected scene light 134 and the reflected backscatter light 132. The first camera 136 collects approximately one hundred percent of the object reflections or reflected light 114 having the second polarization from the at least one light source 102 and collects approximately fifty percent of the backscattered natural light 116. In addition, the camera assembly 120 may include a second camera 138 configured to receive the transmitted backscatter light 130 and to capture a second imaging of the scene 104 including only the transmitted backscatter light 130. Thus, the second camera 138 collects approximately fifty percent of the backscattered natural light 116 while the object reflections are purposely blocked through polarization. Furthermore, the first imaging of the first camera 136 and the second imaging of the second camera 138 may be aligned on a pixel-by-pixel basis. In other words, the first camera 136 and the second camera 138 may produce equivalent images (pixel value alignment) for backscattered natural light 116 and this may be adjusted and compensated, if necessary.

The backscattered natural light 116 may be split into both the first camera 136 and the second camera 138 and thus cancelled using image processing (subtraction of images from each camera) to leave only the light reflected off of the object 106. Therefore, according to further aspects of the disclosure, the imaging assembly 100 also includes an image processor 140 configured to subtract the second imaging captured by the second camera 138 from the first imaging captured by the first camera 136 to determine a remaining imaging. Thus, a pixel-by-pixel subtraction of the imaging of the second camera 138 is done from the imaging of the first camera 136. Imaging from the first camera 136 and the second camera 138 can be more readily processed compared to radar signals, for example, and this solution reduces the glare/noise that can deteriorate the imaging required for processing to recognize objects 106 in the scene 104. Accordingly, the remaining imaging has a reduction in glare and reduced backscattered natural light 116, thereby more acutely elucidating reflections of the object 106 from the at least one light source 102 alone, which may assist vision perception algorithms in more easily recognizing/distinguishing objects 106 in imaged scenes 104. Thus, the imaging in adverse weather, for example, is improved.

In other words, the vehicular vision system 12 of the vehicle 10 may include the camera module or imaging assembly 100 having a first imager or imaging device 136 and a second imager or imaging device 138. The vehicle 10 includes the light source 102 (e.g., a headlamp of the vehicle) that emits circularly polarized light 108 (e.g., lefthand circularly polarized light) so that objects 106 in the field of illumination of the light source 102 may reflect oppositely circularly polarized light 114 (e.g., righthand circularly polarized light). For example, the light source 102 may emit light that passes through the polarizer 110 so that circularly polarized light 108 is emitted toward the objects 106. This circularly polarized light 114 may reflect from the object 106 within the environment to be imaged by the camera module 100. Further, backscattered natural light 116 having random polarization (e.g., with a first orthogonal polarization state S and a second orthogonal polarization state P) may be imaged by the camera module 100.

The camera module 100 includes the optical element or device 112 (e.g., a lens barrel or lens element of the camera module) and the reflected circularly polarized light 114 and the backscattered natural light 116 pass through the optical device 112. The optical device 112 may transmit the circularly polarized light 114 as linearly polarized light 124 in a first linear polarization state (e.g., S linearly polarized light) and the optical device 112 may transmit the backscattered natural light 116 in its linearly polarized states (e.g., S and P linearly polarized light). In other words, the optical device 112, which may include a quarter-wave plate, converts the reflected circularly polarized light 114 into linearly polarized light 124.

The polarizing beam splitter 128 is disposed between the optical device 112 and the imagers of the camera module 100, with the polarizing beam splitter 128 splitting and directing light that passes through the optical device 112 to the first imager 136 and the second imager 138. Specifically, the polarizing beam splitter 128 reflects or directs or transmits S linearly polarized light to the first imager 136 and reflects or directs or transmits P linearly polarized light to the second imager 138. Thus, the S linearly polarized light 134 reflected from the object 106 and the S linearly polarized light 132 from the background natural light 116 are directed to the first imager 136 and the P linearly polarized light 130 from the background natural light 116 is directed to the second imager 138.

Because the S linearly polarized light and the P linearly polarized light may represent substantially similar portions of the environment when imaged by the first imager 136 and the second imager 138 of the camera module 100 (e.g., aligned pixel-by-pixel), the portion of the image data captured by the first imager 136 that corresponds to the image data captured by the second imager 138 may be digitally removed or ignored or weighted during further processing. The portion of the image data captured by the first imager 136 may be representative of the object 106 that reflected the circularly polarized light 114. Thus, the object 106 may be more easily isolated in the image data, such as for object detection and identification/classification. For example, the vehicular vision system may rely on the image data captured by the first imager 136 to a greater degree than the image data captured by the second imager 138 during object detection. The camera module 100 includes the image processor 140, which may process the image data to isolate the object 106 in the captured images and transmit the processed image data to the ECU 18 of the vehicle 10 for further processing.

In some examples, image data captured by the camera module 100 may be processed to generate video images displayed at the display device 16 of the vehicle 10. For example, the image data captured by the first imager 136 and the second imager 138 may be processed to isolate the detected object 106 in the displayed video images, that is to display the detected object 106 in the video images and not display background objects or enhance the visibility of the detected object 106 relative to the background objects, such as by displaying a graphic overlay at the detected object and the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a lens focusing images onto the imaging array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or at least two million photosensor elements or pixels or at least three million photosensor elements or pixels or at least five million photosensor elements or pixels arranged in rows and columns. The imaging array may be sensitive to near-infrared light. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390;

9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715, 093; 6,922,292; 6,757,109; 6,717,610; 6,590,719; 6,201, 642; 5,796,094; 6,559,435; 6,831,261; 6,822,563; 6,946, 978; 7,720,580; 8,542,451; 7,965,336; 7,480,149; 5,877, 897; 6,498,620; 5,670,935; 5,796,094; 6,396,397; 6,806, 452; 6,690,268; 7,005,974; 7,937,667; 7,123,168; 7,004, 606; 6,946,978; 7,038,577; 6,353,392; 6,320,176; 6,313, 454; 6,824,281; 11,165,975; 11,285,873; 11,613,209; 11,794,651 and/or 12,087,061, and/or U.S. Publication Nos. US 2010-0020170 and/or US-2009-0244361, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 12,174, 448; 11,635,672; 11,124,130; 9,896,039; 9,871,971; 9,596, 387; 9,487,159; 8,256,821; 7,480,149; 6,824,281 and/or 6,690,268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a vehicle vision system, such as a forward, sideward or rearward directed vehicle vision system utilizing principles disclosed in U.S. Pat. Nos. 5,550,677; 5,670, 935; 5,760,962; 5,877,897; 5,949,331; 6,222,447; 6,302, 545; 6,396,397; 6,498,620; 6,523,964; 6,611,202; 6,201, 642; 6,690,268; 6,717,610; 6,757,109; 6,802,617; 6,806, 452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321, 111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The ECU may be operable to process data for at least one driving assist system of the vehicle. For example, the ECU may be operable to process data (such as image data captured by a forward viewing camera of the vehicle that views forward of the vehicle through the windshield of the vehicle) for at least one selected from the group consisting of (i) a headlamp control system of the vehicle, (ii) a pedestrian detection system of the vehicle, (iii) a traffic sign recognition system of the vehicle, (iv) a collision avoidance system of the vehicle, (v) an emergency braking system of the vehicle, (vi) a lane departure warning system of the vehicle, (vii) a lane keep assist system of the vehicle, (viii) a blind spot monitoring system of the vehicle and (ix) an adaptive cruise control system of the vehicle. Optionally, the ECU may also or otherwise process radar data captured by a radar sensor of the vehicle or other data captured by other sensors of the vehicle (such as other cameras or radar sensors or such as one or more lidar sensors of the vehicle). Optionally, the ECU may process captured data for an autonomous control system of the vehicle that controls steering and/or braking and/or accelerating of the vehicle as the vehicle travels along the road.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177;

7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:

a first imaging sensor that is operable to capture first image data;

a second imaging sensor that is operable to capture second image data;

a polarizing beam splitter (PBS);

an optical element, wherein light incident at the vehicular camera assembly passes through the optical element to be incident at the PBS;

wherein the vehicular camera assembly is configured to be disposed at a vehicle equipped with a vehicular vision system;

wherein, with the vehicular camera assembly disposed at the vehicle, and with a light source at the vehicle emitting light that is directed toward an object as circularly polarized light, (i) reflected circularly polarized light reflected from the object is incident at the vehicular camera assembly and (ii) backscattered natural light is incident at the vehicular camera assembly;

wherein a first portion of the backscattered natural light comprises backscattered natural light having a first orthogonal polarization state and a second portion of the backscattered natural light comprises backscattered natural light having a second orthogonal polarization state;

wherein the reflected circularly polarized light incident at the vehicular camera assembly passes through the optical element and is incident at the PBS as reflected linearly polarized light having the first orthogonal polarization state, and wherein the first portion of the backscattered natural light and the second portion of the backscattered natural light pass through the optical element;

wherein the PBS (i) directs the reflected linearly polarized light and the first portion of the backscattered natural light to the first imaging sensor capturing the first image data and (ii) directs the second portion of the backscattered natural light to the second imaging sensor capturing the second image data; and wherein the vehicular vision system detects an object based on processing of the first image data and the second image data.

2. The vehicular camera assembly of claim 1, wherein the light source at the vehicle emits light that passes through a polarizer, and wherein the polarizer directs the circularly polarized light toward the object as circularly polarized light having a first polarization, and wherein the reflected circularly polarized light has a second polarization different than the first polarization.

3. The vehicular camera assembly of claim 1, wherein the vehicular vision system processes a frame of image data formed from at least a portion of the first image data and at least a portion of the second image data, and wherein the frame of image data has a reduction in glare and the backscattered natural light.

4. The vehicular camera assembly of claim 1, wherein the optical element comprises a quarter-wave plate.

5. The vehicular camera assembly of claim 1, wherein the PBS (i) reflects the reflected linearly polarized light and the first portion of the backscattered natural light toward the first imaging sensor and (ii) transmits the second portion of the backscattered natural light toward the second imaging sensor.

6. The vehicular camera assembly of claim 1, wherein the PBS prevents transmission of the reflected linearly polarized light toward the second imaging sensor and prevents transmission of the first portion of the backscattered natural light toward the second imaging sensor.

7. The vehicular camera assembly of claim 1, wherein the first image data comprises a first frame of image data representative of a scene exterior the vehicle, and wherein the first frame of image data is representative of only the reflected linearly polarized light and the first portion of the backscattered natural light, and wherein the second image data comprises a second frame of image data representative of the scene exterior the vehicle, and wherein the second frame of image data is representative of only the second portion of the backscattered natural light.

8. The vehicular camera assembly of claim 7, wherein the vehicular vision system processes the first image data and the second image data to subtract the second frame of image data from the first frame of image data to determine a remaining frame of image data, and wherein the remaining frame of image data has a reduction in glare and the backscattered natural light.

9. The vehicular camera assembly of claim 7, wherein the first portion of the backscattered natural light and the second portion of the backscattered natural light each comprise approximately fifty percent of the backscattered natural light transmitted through the optical element.

10. The vehicular camera assembly of claim 7, wherein the first frame of image data and the second frame of image data are aligned on a pixel-by-pixel basis.

11. The vehicular camera assembly of claim 1, wherein the light source comprises a headlamp of the vehicle.

12. The vehicular camera assembly of claim 1, wherein the light source comprises a taillamp of the vehicle.

13. A vehicular camera assembly, the vehicular camera assembly comprising:

a first imaging sensor that is operable to capture first image data;

a second imaging sensor that is operable to capture second image data;

a polarizing beam splitter (PBS);

an optical element, wherein light incident at the vehicular camera assembly passes through the optical element to be incident at the PBS;

wherein the vehicular camera assembly is configured to be disposed at a vehicle equipped with a vehicular vision system;

wherein, with the vehicular camera assembly disposed at the vehicle, and with a light source at the vehicle emitting light that is directed toward an object as circularly polarized light, (i) reflected circularly polarized light reflected from the object is incident at the vehicular camera assembly and (ii) backscattered natural light is incident at the vehicular camera assembly;

wherein the light source at the vehicle emits light that passes through a polarizer, and wherein the polarizer directs the circularly polarized light toward the object as circularly polarized light having a first polarization, and wherein the reflected circularly polarized light has a second polarization different than the first polarization;

wherein a first portion of the backscattered natural light comprises backscattered natural light having a first orthogonal polarization state and a second portion of the backscattered natural light comprises backscattered natural light having a second orthogonal polarization state;

wherein the reflected circularly polarized light incident at the vehicular camera assembly passes through the optical element and is incident at the PBS as reflected linearly polarized light having the first orthogonal polarization state, and wherein the first portion of the backscattered natural light and the second portion of the backscattered natural light pass through the optical element;

wherein the PBS (i) directs the reflected linearly polarized light and the first portion of the backscattered natural light to the first imaging sensor capturing the first image data and (ii) directs the second portion of the backscattered natural light to the second imaging sensor capturing the second image data;

wherein the vehicular vision system processes a frame of image data formed from at least a portion of the first image data and at least a portion of the second image data, and wherein the frame of image data has a reduction in glare and the backscattered natural light; and wherein the vehicular vision system detects an object based on processing of the first image data and the second image data.

14. The vehicular camera assembly of claim 13, wherein the optical element comprises a quarter-wave plate.

15. The vehicular camera assembly of claim 13, wherein the PBS prevents transmission of the reflected linearly polarized light toward the second imaging sensor and prevents transmission of the first portion of the backscattered natural light toward the second imaging sensor.

16. The vehicular camera assembly of claim 13, wherein the light source comprises one selected from the group consisting of (i) a headlamp of the vehicle and (ii) a taillamp of the vehicle.

17. A vehicular camera assembly, the vehicular camera assembly comprising:

a first imaging sensor that is operable to capture first image data;

a second imaging sensor that is operable to capture second image data;

a polarizing beam splitter (PBS);

an optical element, wherein light incident at the vehicular camera assembly passes through the optical element to be incident at the PBS;

wherein the vehicular camera assembly is configured to be disposed at a vehicle equipped with a vehicular vision system;

wherein, with the vehicular camera assembly disposed at the vehicle, and with a light source at the vehicle emitting light that is directed toward an object as circularly polarized light, (i) reflected circularly polarized light reflected from the object is incident at the vehicular camera assembly and (ii) backscattered natural light is incident at the vehicular camera assembly;

wherein the light source comprises one selected from the group consisting of (i) a headlamp of the vehicle and (ii) a taillamp of the vehicle;

wherein a first portion of the backscattered natural light comprises backscattered natural light having a first orthogonal polarization state and a second portion of the backscattered natural light comprises backscattered natural light having a second orthogonal polarization state;

wherein the reflected circularly polarized light incident at the vehicular camera assembly passes through the optical element and is incident at the PBS as reflected linearly polarized light having the first orthogonal polarization state, and wherein the first portion of the backscattered natural light and the second portion of the backscattered natural light pass through the optical element;

wherein the PBS (i) directs the reflected linearly polarized light and the first portion of the backscattered natural light to the first imaging sensor capturing the first image data and (ii) directs the second portion of the backscattered natural light to the second imaging sensor capturing the second image data;

wherein the first image data comprises a first frame of image data representative of a scene exterior the vehicle, and wherein the first frame of image data is representative of only the reflected linearly polarized light and the first portion of the backscattered natural light, and wherein the second image data comprises a second frame of image data representative of the scene exterior the vehicle, and wherein the second frame of image data is representative of only the second portion of the backscattered natural light; and wherein the vehicular vision system detects an object based on processing of the first image data and the second image data.

18. The vehicular camera assembly of claim 17, wherein the light source at the vehicle emits light that passes through a polarizer, and wherein the polarizer directs the circularly polarized light toward the object as circularly polarized light having a first polarization, and wherein the reflected circularly polarized light has a second polarization different than the first polarization.

19. The vehicular camera assembly of claim 17, wherein the optical element comprises a quarter-wave plate.

20. The vehicular camera assembly of claim 17, wherein the PBS prevents transmission of the reflected linearly polarized light toward the second imaging sensor and prevents transmission of the first portion of the backscattered natural light toward the second imaging sensor.

21. The vehicular camera assembly of claim 17, wherein the vehicular vision system processes the first image data and the second image data to subtract the second frame of image data from the first frame of image data to determine a remaining frame of image data, and wherein the remaining frame of image data has a reduction in glare and the backscattered natural light.

22. The vehicular camera assembly of claim 17, wherein the first portion of the backscattered natural light and the second portion of the backscattered natural light each comprise approximately fifty percent of the backscattered natural light transmitted through the optical element.

23. The vehicular camera assembly of claim 17, wherein the first frame of image data and the second frame of image data are aligned on a pixel-by-pixel basis.

* * * * *